(12) United States Patent
Clark

(10) Patent No.: US 11,919,246 B2
(45) Date of Patent: Mar. 5, 2024

(54) 5D PART GROWING MACHINE WITH VOLUMETRIC DISPLAY TECHNOLOGY

(71) Applicant: Daniel S. Clark, Orangevale, CA (US)

(72) Inventor: Daniel S. Clark, Orangevale, CA (US)

( * ) Notice: Subject to any disclaimer, the term of this patent is extended or adjusted under 35 U.S.C. 154(b) by 0 days.

(21) Appl. No.: 17/223,312

(22) Filed: Apr. 6, 2021

(65) Prior Publication Data

US 2021/0291460 A1    Sep. 23, 2021

Related U.S. Application Data

(63) Continuation-in-part of application No. 15/924,184, filed on Mar. 17, 2018, now Pat. No. 10,967,578.

(60) Provisional application No. 62/530,885, filed on Jul. 11, 2017.

(51) Int. Cl.
| | |
|---|---|
| *B29C 64/393* | (2017.01) |
| *B29C 64/135* | (2017.01) |
| *B33Y 10/00* | (2015.01) |
| *B33Y 50/02* | (2015.01) |
| *G06N 3/02* | (2006.01) |

(52) U.S. Cl.
CPC .......... *B29C 64/393* (2017.08); *B29C 64/135* (2017.08); *B33Y 10/00* (2014.12); *B33Y 50/02* (2014.12); *G06N 3/02* (2013.01)

(58) Field of Classification Search
CPC ............................ B29C 64/277; B29C 64/282
See application file for complete search history.

(56) References Cited

U.S. PATENT DOCUMENTS

| | | | |
|---|---|---|---|
| 3,829,838 | A | 8/1974 | Lewis et al. |
| 4,575,330 | A | 3/1986 | Hull |
| 4,707,787 | A | 11/1987 | Savit et al. |
| 4,752,498 | A | 6/1988 | Fudim |
| 4,929,402 | A | 5/1990 | Hull |
| 4,999,143 | A | 3/1991 | Hull et al. |
| 5,006,364 | A | 4/1991 | Fan |
| 5,071,337 | A | 12/1991 | Heller et al. |
| 5,121,329 | A | 6/1992 | Crump |
| 5,137,662 | A | 8/1992 | Hull et al. |
| 5,139,338 | A | 8/1992 | Pomerantz et al. |
| 5,143,663 | A | 9/1992 | Leyden et al. |
| 5,174,931 | A | 12/1992 | Almquist et al. |
| 5,182,055 | A | 1/1993 | Allison et al. |
| 5,236,637 | A | 8/1993 | Hull |
| 5,247,180 | A | 9/1993 | Mitcham et al. |
| 5,248,249 | A | 9/1993 | Yamamoto et al. |
| 5,248,456 | A | 9/1993 | Evans, Jr. et al. |

(Continued)

OTHER PUBLICATIONS

Ruiz-Avila, Jaime, "Holovect: Holographic Vector Display", Kickstarter, https://www.kickstarter.com/projects/2029950924/holovect-holographic-vector-display, Oct. 2016.

(Continued)

*Primary Examiner* — Galen H Hauth
(74) *Attorney, Agent, or Firm* — The Roy Gross Law Firm, LLC; Roy Gross

(57) ABSTRACT

Methods and systems of and for using volumetric display technology including volumetric display technology to create three-dimensional objects for various industries, including, but not limited to solar, automotive and/or other technological areas that use 3D printing or additive manufacturing.

17 Claims, 6 Drawing Sheets
(1 of 6 Drawing Sheet(s) Filed in Color)

(56) References Cited

U.S. PATENT DOCUMENTS

| | | | |
|---|---|---|---|
| 5,256,340 | A | 10/1993 | Allison et al. |
| 5,260,009 | A | 11/1993 | Penn |
| 5,263,130 | A | 11/1993 | Pomerantz et al. |
| 5,268,862 | A | 12/1993 | Rentzepis |
| 5,345,391 | A | 9/1994 | Hull et al. |
| 5,358,673 | A | 10/1994 | Heller et al. |
| 5,391,072 | A | 2/1995 | Lawton et al. |
| 5,427,733 | A | 6/1995 | Benda et al. |
| 5,437,820 | A | 8/1995 | Brotz |
| 5,447,822 | A | 9/1995 | Hull et al. |
| 5,506,607 | A | 4/1996 | Sanders, Jr. et al. |
| 5,529,473 | A | 6/1996 | Lawton et al. |
| 5,545,367 | A | 8/1996 | Bae et al. |
| 5,569,431 | A | 10/1996 | Hull |
| 5,571,471 | A | 11/1996 | Hull |
| 5,573,721 | A | 11/1996 | Gillette |
| 5,609,812 | A | 3/1997 | Childers et al. |
| 5,609,813 | A | 3/1997 | Allison et al. |
| 5,630,981 | A | 5/1997 | Hull |
| 5,651,934 | A | 7/1997 | Almquist et al. |
| 5,653,925 | A | 8/1997 | Batchelder |
| 5,684,621 | A | 11/1997 | Downing |
| 5,711,911 | A | 1/1998 | Hull |
| 5,740,051 | A | 4/1998 | Sanders, Jr. et al. |
| 5,745,197 | A | 4/1998 | Leung et al. |
| 5,817,206 | A | 10/1998 | McAlea et al. |
| 5,891,382 | A | 4/1999 | Almquist et al. |
| 5,897,825 | A | 4/1999 | Fruth et al. |
| 5,902,537 | A | 5/1999 | Almquist et al. |
| 5,906,863 | A | 5/1999 | Lombardi et al. |
| 5,932,290 | A | 8/1999 | Lombardi et al. |
| 5,945,058 | A | 8/1999 | Manners et al. |
| 5,956,172 | A | 9/1999 | Downing |
| 5,965,079 | A | 10/1999 | Manners |
| 5,980,813 | A | 11/1999 | Narang et al. |
| 6,027,324 | A | 2/2000 | Hull |
| 6,048,487 | A | 4/2000 | Almquist et al. |
| 6,051,179 | A | 4/2000 | Hagenau |
| 6,180,050 | B1 | 1/2001 | Arai et al. |
| 6,253,116 | B1 | 6/2001 | Zhang et al. |
| 6,261,507 | B1 | 7/2001 | Gigl et al. |
| 6,264,873 | B1 | 7/2001 | Gigl et al. |
| 6,266,167 | B1 | 7/2001 | Klug et al. |
| 6,305,769 | B1 | 10/2001 | Thayer et al. |
| 6,330,088 | B1 | 12/2001 | Klug et al. |
| 6,391,245 | B1 | 5/2002 | Smith |
| 6,441,338 | B1 | 8/2002 | Rabinovich |
| 6,500,378 | B1 | 12/2002 | Smith |
| 6,508,971 | B2 | 1/2003 | Leyden et al. |
| 6,547,552 | B1 | 4/2003 | Fudim |
| 6,649,113 | B1 | 11/2003 | Manners et al. |
| 6,661,548 | B2 | 12/2003 | Klug et al. |
| 6,733,267 | B2 | 5/2004 | Chapman et al. |
| 6,813,594 | B2 | 11/2004 | Guertin et al. |
| 6,833,234 | B1 | 12/2004 | Bloomstein et al. |
| 6,836,736 | B2 | 12/2004 | Allen et al. |
| 6,942,830 | B2 | 9/2005 | Mulhaupt et al. |
| 7,052,263 | B2 | 5/2006 | John |
| 7,083,405 | B2 | 8/2006 | Koyagi et al. |
| 7,128,866 | B1 | 10/2006 | Henningsen |
| 7,161,722 | B2 | 1/2007 | Brotherton-Ratcliffe et al. |
| 7,215,430 | B2 | 5/2007 | Kacyra et al. |
| 7,467,939 | B2 | 12/2008 | Sperry et al. |
| 7,550,251 | B2 | 6/2009 | McLean et al. |
| 7,568,904 | B2 | 8/2009 | Koyagi et al. |
| 7,573,561 | B2 | 8/2009 | Fries |
| 7,636,610 | B2 | 12/2009 | Schillen et al. |
| 7,783,371 | B2 | 8/2010 | John et al. |
| 7,785,093 | B2 | 8/2010 | Holmboe et al. |
| 7,790,093 | B2 | 9/2010 | Shkolnik et al. |
| 7,831,328 | B2 | 11/2010 | Schillen et al. |
| 7,858,913 | B2 * | 12/2010 | Refai ............ G03B 35/20 353/94 |
| 7,894,921 | B2 | 2/2011 | John et al. |
| 7,968,626 | B2 | 6/2011 | Giller et al. |
| 8,017,055 | B2 | 9/2011 | Davidson et al. |
| 8,126,580 | B2 | 2/2012 | El-Siblani et al. |
| 8,167,999 | B2 | 5/2012 | Alam et al. |
| 8,252,223 | B2 | 8/2012 | Medina et al. |
| 8,506,862 | B2 | 8/2013 | Giller et al. |
| 8,562,324 | B2 | 10/2013 | Pettis |
| 8,747,097 | B2 | 6/2014 | Pettis |
| 8,992,202 | B2 | 3/2015 | Pettis |
| 9,022,770 | B2 | 5/2015 | Pettis |
| 9,034,237 | B2 | 5/2015 | Sperry et al. |
| 9,205,601 | B2 | 12/2015 | DeSimone et al. |
| 9,211,678 | B2 | 12/2015 | DeSimone et al. |
| 9,213,312 | B2 | 12/2015 | Pyun et al. |
| 9,216,546 | B2 | 12/2015 | DeSimone et al. |
| 9,321,215 | B2 | 4/2016 | Dudley |
| 9,323,068 | B2 | 4/2016 | Xin et al. |
| 9,360,757 | B2 | 6/2016 | DeSimone et al. |
| 9,430,169 | B2 | 8/2016 | Pettis |
| 9,498,920 | B2 | 11/2016 | DeSimone et al. |
| 9,527,244 | B2 | 12/2016 | El-Siblani |
| 2010/0125356 | A1 | 5/2010 | Shkolnik et al. |
| 2013/0177972 | A1 | 7/2013 | Green et al. |
| 2014/0023996 | A1 | 1/2014 | Finn et al. |
| 2016/0271875 | A1* | 9/2016 | Brown, Jr. ............ B29C 64/135 |
| 2017/0129167 | A1 | 5/2017 | Castanon |
| 2017/0173892 | A1 | 6/2017 | Steele |
| 2018/0207876 | A1 | 7/2018 | Querol Esparch et al. |
| 2018/0250890 | A1 | 9/2018 | Claussen et al. |

OTHER PUBLICATIONS

Smalley et al. (2018). A photophoretic-trap volumetric display. Nature 553, 486-490. doi: 10.1038/nature25176.

Patel, S., Cao, J. & Lippert, A. A volumetric three-dimensional digital light photoactivatable dye display. Nat Commun 8, 15239 (2017). https://doi.org/10.1038/ncomms15239.

SMU blog post, Better than Star Wars: Chemistry discovery yields 3-D table-top objects crafted from light. Retrieved from: https://blog.smu.edu/research/2017/07/10/better-than-star-wars-chemistry-discovery-yields-3-d-table-top-objects-crafted-from-light/.

Agarwal (2018). Mimicking and searching for the form of human soul by interpreting naturally occurring patterns through a set of algorithms.

Mody, Natasha D. (2018). Demystifying the future of the screen.

Burny, Nicolas et al. (2018). Feedup, Feedback, and Feedforward in Curve Mid-Air 30 Gestures.ACM Cont. on Human Aspects in Computing Systems (CH 1'18) Workshop on Mid-Air Haptics for Control Interfaces. In: M. Giordano et al., Proceedings of Workshop on Mid-Air Haptics tor Control Interfaces, 2018; DOI: 10.1145/3170427.3170625.

Sher, Davide (2019). More details emerge on UC Berkeley-LLNL new CAL volumetric 3D printing. Retrieved from: https://www.3dprintingmedia.network/more-details-emerge-on-uc-berkeley-llnl-new-cal-volumetric-3d-printing-method/.

Smalley et al. (2018). Volumetric Displays: Turning 3-D Inside Out. Optics and Photonics News; DOI:10.1364/OPN.29.6.000026.

Maeda, Y., Miyazaki, D., & Maekawa, S. (2015). Volumetric aerial three-dimensional display based on heterogeneous imaging and image plane scanning. Applied Optics, 54(13), 4109. doi:10.1364/ao.54.004109.

Carman (2016). Real holographic displays are becoming a thing. The Verge. Oct. 18, 2016. Retrieved from: https://www.theverge.com/circuitbreaker/2016/10/18/13321910/hologram-display-holovect-kickstarter.

Sher (2019). T3DP's new volumetric printing process may finally pave way to 3D printed solar cells. 3D Printing Media Network . . . Retrieved from: https://www.3dprintingmedia.network/t3dps-new-volumetric-3d-printing-process-may-finally-pave-way-to-3d-printed-solar-cells/#:~:text=Combining%20material%20science%20and%20advanced,viable%20and%20cost%2Deffective%20solution.

* cited by examiner

3D OBJECT

3D CONTOUR DISPLAY

3D CONTOUR IMAGE

5D PART GROWING MACHINE WITH VOLUMETRIC DISPLAY TECHNOLOGY

CROSS-REFERENCE TO RELATED APPLICATION

The present application is a continuation-in-part of U.S. patent Ser. No. 15/924,184 filed Mar. 17, 2018, which claims the benefit of priority of U.S. Provisional Patent Application Ser. No. 62/530,885 filed Jul. 11, 2017, entitled 5D PART GROWING MACHINE WITH VOLUMETRIC DISPLAY TECHNOLOGY. The contents of the above referenced applications are hereby incorporated by reference into this application in their entirety.

FIELD OF THE INVENTION

The present invention is directed to a system and method for using three-dimensional ("3D") volumetric display vector techniques, computer and software controlled photonic energy emitters such as but not limited to ultraviolet ("UV"), visible light spectrum, and/or infrared ("IR") emitting and/or projection techniques, and photonic energy reactive, curable, or solidifying material to produce objects for various industries, including, but not limited to solar, automotive, and/or other technological areas that utilize known 3D printing or additive manufacturing techniques.

BACKGROUND OF THE INVENTION 3D printing refers to processes used to create a 3D object in which very thin layers of material are formed under computer control. Objects of near unlimited shape or geometry are produced using digital model data from a 3D model or other electronic data source such as a computer-aided design ("CAD") and/or stereolithography ("STL") files. Thus, unlike material removed or "hogged out" from solid stock as in conventional machining or lathe processes, 3D printing and/or additive manufacturing "builds" or "grows" a 3D object in accordance with digital model data by successively adding material layer upon layer in order to form an object.

Known 3D printing systems and methods include U.S. Pat. No. 4,575,330 to Hull, U.S. Pat. No. 5,956,172 to Downing, U.S. Pat. No. 8,126,580 to El-Silani et al. and U.S. Pat. No. 9,213,312 to Pyun et al. Additional existing known systems include U.S. Pat. Nos. 3,829,838, 4,575,330, 4,707,787, 4,752,498, 4,929,402, 4,999,143, 5,006,364, 5,071,337, 5,121,329, 5,137,662, 5,139,338, 5,143,663, 5,174,931, 5,182,055, 5,236,637, 5,247,180, 5,248,456, 5,256,340, 5,260,009, 5,263,130, 5,268,862, 5,345,391, 5,358,673, 5,391,072, 5,427,733, 5,437,820, 5,447,822, 5,506,607, 5,529,473, 5,545,367, 5,569,431, 5,571,471, 5,573,721, 5,609,812, 5,609,813, 5,630,981, 5,651,934, 5,653,925, 5,684,621, 5,711,911, 5,740,051, 5,817,206, 5,891,382, 5,897,825, 5,902,537, 5,906,863, 5,932,290, 5,945,058, 5,965,079, 5,980,813, 6,027,324, 6,048,487, 6,051,179, 6,180,050, 6,253,116, 6,261,507, 6,264,873, 6,266,167, 6,305,769, 6,330,088, 6,391,245, 6,441,338, 6,500,378, 6,508,971, 6,547,552, 6,649,113, 6,661,548, 6,733,267, 6,813,594, 6,833,234, 6,836,736, 6,942,830, 7,052,263, 7,083,405, 7,128,866, 7,161,722, 7,215,430, 7,467,939, 7,550,251, 7,568,904, 7,573,561, 7,636,610, 7,783,371, 7,785,093, 7,790,093, 7,831,328, 7,858,913, 7,894,921, 7,968,626, 8,017,055, 8,167,999, 8,252,223, 8,506,862, 8,562,324, 8,747,097, 8,992,202, 9,022,770, 9,034,237, 9,205,601, 9,211,678, 9,216,546, 9,323,068, 9,360,757, 9,430,169, 9,498,920, 9,527,244.

Disadvantageously however, known additive manufacturing or 3D printing systems and methods are time consuming because the required layering of material may take hours to days to produce even a small 3D object, thus, greatly limiting the overall size and quantity of desired 3D objects being produced.

Furthermore, 3D printing techniques are often limited as certain objects are not able to be produced with 3D printing, as producing layer upon layer prohibits the manufacturing of certain designs and configurations.

To overcome the disadvantages of the prior-art, it is desired to provide a novel system and method of producing 3D objects.

SUMMARY OF THE INVENTION

It is an object of the present invention to provide methods and systems of and for creating and/or producing 3D objects quickly using 3D volumetric display vector techniques.

It is an object of the present invention to provide methods and systems of and for creating and/or producing 3D objects using 3D volumetric display vector techniques utilizing photonic energy emitters and phonic energy reactive, curable, and/or solidifying material in combination with flood and drain additive manufacturing techniques.

It is an object of the present invention to provide methods and systems of and for creating and/or producing 3D objects using 3D volumetric display vector techniques utilizing a UV curable photopolymer in combination with flood and drain additive manufacturing techniques.

It is an object of the present invention to provide methods and systems of and for creating and/or producing 3D objects utilizing 3D volumetric display vector techniques including at least two, and preferably three or more, photonic energy emitters in combination with a UV reactive or curable material, such as a photopolymer, and flood and drain techniques. A platform, palette, or reservoir holds or contains the UV curable photopolymer, and photonic emitters produce a full and complete desired 3D image by application of volumetric display vectors. The method and system is facilitative of and for high-speed and/or high-volume production of 3D objects.

It is an object of the present invention to produce 3D objects utilizing 3D volumetric display vectors via high-speed layering and/or "flash emitting" of photonic energy to solidify or cure a UV photopolymer. Typically, such is not achievable because large UV projections cause the accumulation of excessive heat within the material or polymer, thus causing unwanted warp or distortion of a finished 3D object.

It is an object of the present invention to produce 3D objects using an "inside-out" technique, such that the volumetric internal layers of the 3D objects are created from the inside first, followed by outer layers being created after the volumetric internal layers are cured.

These and other objects of the invention are achieve by providing a system for producing three-dimensional objects, the system comprising: at least three photonic energy emitters; photonic energy curable material; and a flood and drain system, wherein the flood and drain system is configured to allow the photonic energy curable material to flood and drain within a chamber system, and wherein the at least three photonic energy emitters cure the photonic energy curable material to produce a three-dimensional object.

In certain embodiments, the chamber system includes an upper chamber, a pump and a lower chamber.

In certain embodiments, the lower chamber is a reservoir that stores the photonic energy curable material.

In certain embodiments, the chamber system includes an overflow port that returns the photonic energy curable material to the lower chamber In certain embodiments, the system further includes cryogenic cooling means, the cryogenic cooling means configured to cool the cure the photonic energy curable material. In certain embodiments, the cooling is via freezer with or without the cryogenic cooling means. In certain embodiments, the cooling of resin speeds up the volumetric 3D printing process.

In certain embodiments, the cryogenic cooling means is selected from a group consisting of Dry Ice or Liquid Nitrogen. In certain embodiments, cryogenic or other forms of cooling are used to control the exterior temperature of flood and drain tray and pentagon shaped build vat. In certain embodiments, the cooling is via a freezer, Refrigerator, or cryogenic cooling technique. In certain embodiments, the cooling keeps the resin from heating up.

In certain embodiments, there are additional methods to cool the resin. The resin container may have two hermetically sealed metal layers, such that liquid nitrogen is injected into the second outer layer. In this manner, the temperature of the resin in the first layer of the tank is controlled.

In certain embodiments, the cryogenic cooling means acts as a heat transfer device to remove heat from the system.

In certain embodiments, the photonic energy curable material is a UV photopolymer.

In certain embodiments, the volumetric 3d printing techniques are suitable for metals and ceramics in a photoreactive organic binder. In certain embodiments, the metal and ceramic materials use the same volumetric 3d printing process but use a UV cureable organic binder instead of a photonic energy curable material or photopolymer.

In certain embodiments, the photonic energy curable material includes other polymers or resins that are configured to interact with the at least three photonic energy emitters.

In certain embodiments, a UV curable photopolymer is applied in conjunction with the other resins and/or polymers.

In certain embodiments, the number of the at least three photonic energy emitters range from three photonic energy emitters to one thousand photonic energy emitters.

In certain embodiments, the system includes a build platform, wherein the three-dimensional object is cured upon the build platform.

In certain embodiments, the build platform includes a flat bottomed spherical vat.

In certain embodiments, the at least three photonic energy emitters are selected from a group consisting of a laser, LED projection system, LCD projection system, DLP projection system, LCOS projection system, 3d Printed SLM, SLA (Sterolithography), and combinations thereof.

In certain embodiments, the system uses a DLP projector instead of lasers.

In certain embodiments, the system uses a DLP projector in combination with lasers.

In certain embodiments, the system uses LCD, LED, LCD, LCOS, 3d Printed SLM, and DLP projection technology to create objects for various industries alone or in combination with lasers.

In certain embodiments, the at least three photonic energy emitters use volumetric display technology. In certain embodiments, the at least three photonic energy emitters are lasers and LED lights.

In certain embodiments, the least three photonic energy emitters use masers (microwave lasers) and microwaves. Microwaves and masers can penetrate deep in the photo reactive organic binder full of metals and ceramics.

In certain embodiments, the volumetric maser penetrates a thermal setting plastic.

In certain embodiments, the maser works like a laser (i.e., Microwave Amplification By Stimulated Emission OF Radiation). In certain embodiments, the maser works using a thermal initiator instead of a photo initiator.

In certain embodiments, the system produces multiple three-dimensional objects.

In certain embodiments, the multiple three-dimensional objects are sections of a larger three-dimensional object.

In certain embodiments, the multiple three-dimensional objects are created using an "inside-out" technique, whereby the volumetric internal layers of the 3D objects are created from the inside first, followed by outer layers being created after the volumetric internal layers are cured.

In certain embodiments, at least three photonic energy emitters are arranged above the chamber system, wherein the at least three photonic energy emitters are configured to emit photonic energy into the chamber system to cure the photonic energy curable material.

In certain embodiments, two or more photonic energy emitters are provided using a combination of any of the following photonic energy emitters having different light spectrums DLP, UV-DLP, UV-Laser, Laser, UV LED, SLM, LOCS. In certain embodiments, these photonic energy emitters are used in combination with one another.

In certain embodiments, the two or more photonic energy emitters include a UV light emitter and a physical light (blue physical light) emitter such as a DLP projector. Colors include, but are not limited to, Near Infrared, Infrared, Blue, and UV light, and can be combined to produce this dual color photo initiation or inhibition.

In certain embodiments, a Photonic Energy Emitter chemically inhibits polymerization. An example would be using UV Light or another Light Spectrum to Inhibit Polymerization. This allows for projecting more powerful light wavelengths in the resin without it polymerizing into plastic. There are many ways to co-initiate using photo-inhibiting and photo-polymerization whether through use of chemical additives or projecting a very low intensity light. Different lightwave lengths/colors include, but are not limited to, Near Infrared, Red, Blue, and Violet. These colors produced via photonic energy emitters can be combined with a multitude of photonic energy emitters such as DLP and Lasers to provide the ability to project in real time a complete 3d projection in the resin with for example Near Infrared or Visible Light Photo Switching where the full 3d hologram/projection is displayed instantly in the photo polymer and inhibits because the resin is tuned to polymerize at the other color. Once the near infrared full 3d projection is levitating in the resin, the second color light source is flashed or flickered on and off where it then polymerizes only in that 3d cross section where the two photonic energy emitters converge.

In certain embodiments, the UV, Visible, or Near Infrared Light is configured to flicker or flash on and off. In certain embodiments, the UV light is inhibiting the resin. UV Light can only penetrate 30 mm deep in the resin while Visible Light such as Blue or Violet can travel farther. It has been seen that other light sources travel even deeper in the resin such as near infrared and infrared light.

In certain embodiments, the UV, Visible, or Near Infrared Photonic Energy Emitter converge to polymerize the object using a photo switchable, photo initiator and single or dual initiating and inhibiting or a combination of in any sequence.

In certain embodiments, there is real time projections for One Step Volumetric Printing which requires Advanced Computing Power and Neural Networks which can Software Control the Point Cloud Vectors.

In certain embodiments, the system uses Flood and Drain Technology to Filter particulate waste. The UV Curable Resin that is utilized is thick with a high viscosity where printed parts are levitating in the resin with no support structures. The laser speckle from the projections create little pieces of particulate plastic matter that float in the resin making it unable to be reused. The EBB & Flow or Flood and Drain is used to filter out this waste.

In some embodiments, two or more photonic energy emitters are used with a Co-Existing, Dual Light Wavelength process utilizing Photoinitiation and Photoinhibition with many different light combinations.

In some embodiments, Two Different Photonic Energy Emitter Color Light Wavelengths intersect and the Photo Polymerization occurs only in that volumetric 3D cross section. When at least two different light colors converge, the photo inhibitor can prevent the polymerization. Both light sources converging normally would polymerize the object instantly but in this case the photo inhibitor keeps it from polymerizing. Flashing or flickering the inhibiting color on and off polymerizes the 3D object only in that 3D Cross Section.

In certain embodiments, it is also possible for continuous production projecting Volumetric BAS Relief or Low Relief 3D Sections in particular sequence angles without deviating from the core technology. Instead of projecting the whole 3D projection in one shot, Low Relief or Large Bas Relief Chunks of the image are projected in a continuous sequence.

In certain embodiments, it is also possible to build a Laser Sheet for Dual Color Volumetric Polymerization utilizing multiple Photonic Energy Light Wavelengths. A laser or multiple lasers are formed into a low relief light sheet or a smooth flat light sheet. In certain embodiments, the two or more photonic energy emitters employ Co-Existing, Dual Light Wavelengths.

In certain embodiments, the two or more photonic energy emitters employ Co-Existing, Dual Light Wavelength Photo Initiators. While the Visible, UV, or Infrared 3D Projection is levitating in the resin, the UV, Visible, or Infrared Light Sheet moves linearly, vertically, or any (or various) directions across the 3D projection area slowly. Where the light sheet and 3d projection intersect, the dual color initiators activate and instantly polymerizes the object.

In certain embodiments, the system includes Advanced Neural Network to project real time 3D projections. In current holography one needs a super computer to project real time volumetric images. Meshing the computing power and bandwidth from supercomputer clusters works effectively and so does advanced neural networks that do not require the massive amounts of computes.

In certain embodiments, a Laser Light Sheet is provided. A laser can be formed into a sheet or flat shape that can be moved throughout the volume where dual light/color polymerization occurs.

In certain embodiments, a DLP Projector and one or more Lasers are provided. Each photonic energy emitters is used to intersect each other and when that occurs the object is polymerized.

In certain embodiments, multiple DLP Projectors, SLM's, and Lasers are utilized. The combinations of these Photonics energy emitters can be combined in any iterations for Dual/Light Wavelength Photo Polymerization.

In certain embodiments, a photo switchable photo initiator is used. This is utilized to activate the photoswitch molecules so that the complete 3D Volumetric Image is displayed in 3D and polymerizes the object.

In certain embodiments, near Infrared Photo-Switching is used. UV is limited in penetration so when Near Infrared Light is used the penetration depth is much deeper in the resin overcoming the depth of penetration issues with UV Light.

In certain embodiments, Photonic Energy Emitters with Dual Light Wavelength are used. Visible, Near Infrared, or UV light is used to polymerize the object only in the 3D cross section.

In certain embodiments, lasers are formed into planar volumetric light sheet chunks. Similar to a flat laser sheet, a chunk is just like a Low-Bas Relief Chunk that is shaped via one or more lasers.

In certain embodiments, Two Different Light Wavelengths are combined to trigger One Step Volumetric Polymerization in the 3D Cross Section. This is where the full 3D image is projected in the resin and the whole volume is polymerized instantly when the two photonic energy emitters intersect.

In certain embodiments, Volumetric Display, 3D digital light photoactivatable dye display (3D Light PAD) is utilized. This Volumetric Display utilizes Photo-Switch Molecules which can activate and reactive light in 3D volume on command to project true Volumetric Images that are not mirages.

In certain embodiments, a photo switchable, photo initiator is used for photo curing. The photo switch initiator is utilized to polymerize the object.

In certain embodiments, a Bas Relief or Low Relief DLP Projections are used. The low relief is a small 3D Chunk and the Bas Relief is a Larger 3D Chunk.

In certain embodiments, Photonic Energy emitters can be arranged in multiple colors, numbers, and configurations as seen in FIGS. 4a-4c.

Other objects of the invention are achieved by providing a method for producing three-dimensional objects, the method comprising: providing a system comprising at least three photonic energy emitters, a flood and drain system having a chamber system, and a build platform; providing photonic energy curable material; projecting a 3D image using the least three photonic energy emitters onto the build platform; flooding the photonic energy curable material into the chamber system, wherein the build platform is within the chamber system; draining the photonic energy curable material away from the chamber system while curing the photonic energy curable material in the shape of the 3D image, wherein the photonic energy curable material intersected by the photonic energy emitted by the least three photonic energy emitters cures the photonic energy curable material to produce a three-dimensional object.

In certain embodiments, the flood and drain system includes an upper chamber, a pump and a lower chamber, and wherein the photonic energy curable material flows from the lower chamber to flood the upper chamber, and returns to the lower chamber, while a portion of the photonic energy curable material is cured to form the three-dimensional object.

In certain embodiments, the three-dimensional object is configured to be made in sections whereby the at least three photonic energy emitters create various three-dimensional objects that merge to form a larger three-dimensional object.

In certain embodiments, the step of projecting the 3D image using the least three photonic energy emitters onto the build platform occurs prior to the step of flooding the photonic energy curable material into the chamber system.

In certain embodiments, the step of projecting the 3D image using the least three photonic energy emitters onto the build platform occurs after the step of flooding the photonic energy curable material into the chamber system.

In certain embodiments, the method flashes a 3D image in a full vat of photonic energy curable material and 3D objects are created in seconds.

Other objects of the invention and its particular features and advantages will become more apparent from consideration of the following drawings and accompanying detailed description. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF THE INVENTION

Figure 1:
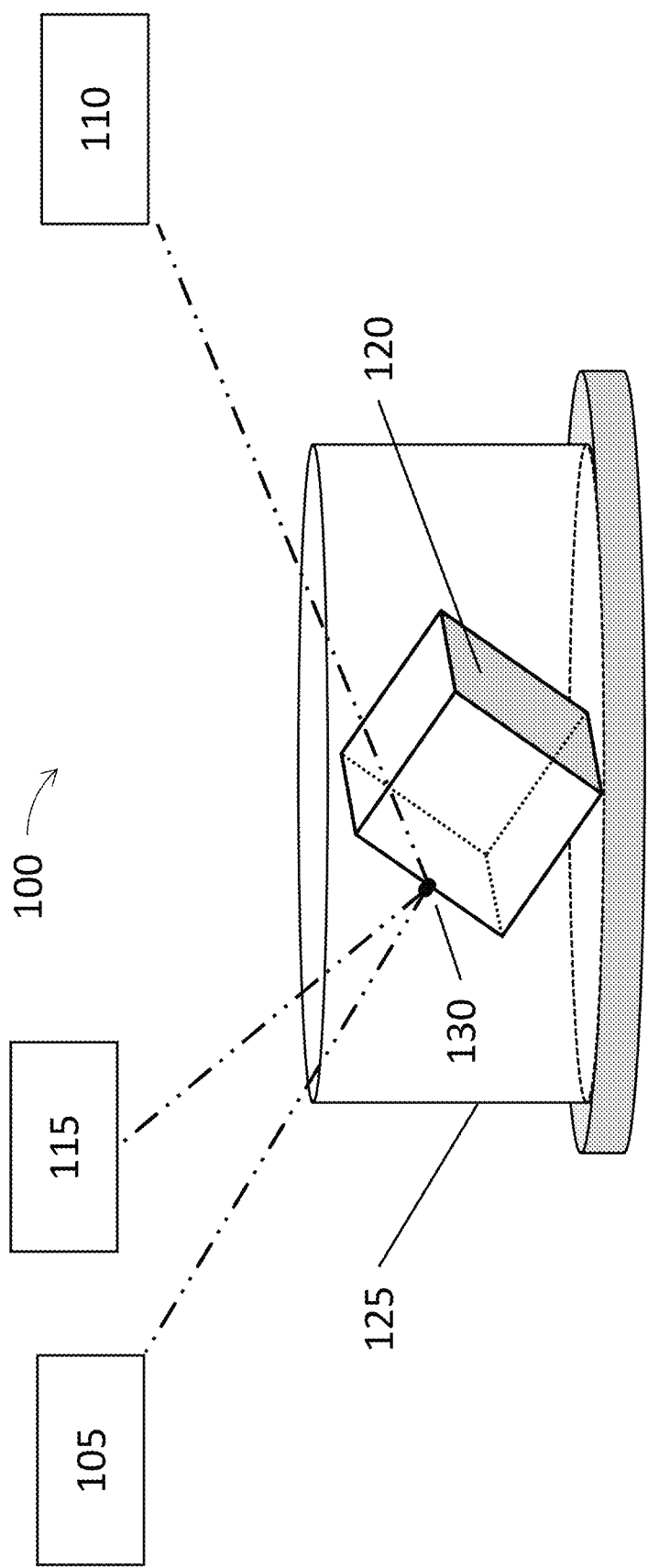
FIG. 1 depicts the inventive volumetric display vector system utilizing two photonic emitters.

In the following description, numerous details are set forth for the purpose of explanation. However, one of ordinary skill in the art will realize that the invention may be practiced without the use of these specific details.

The content of U.S. Pat. No. 5,745,197 is incorporated by reference into this application in its entirety.

For ease of understanding and conceptual visualization, the inventive concept is directed towards mass manufacturing of three-dimension objects including finished parts very quickly.

Additive manufacturing and/or 3D printers utilize UV or other type correlated emitters (i.e. lasers) to cure or solidify materials such photopolymers to "build" or "grow" 3D objects layer upon layer. However, there is no known technique that utilizes correlated 3D volumetric display vectors in combination with flood and drain techniques to build 3D objects quickly, efficiently, and without the limitations of known layer upon layer techniques, as used in conventional additive manufacturing or 3D manufacturing techniques.

In certain embodiments, the inventive system and method is directed to building entire and complete 3D objects quickly utilizing correlated 3D volumetric display vectoring.

In certain embodiments, the inventive system and method is used to mass produce 3D printed solar frames and other functional parts such as automotive parts and the like.

In certain embodiments, the instant invention is directed to correlated 3D volumetric display vectoring including a flood and drain process, and cryogenic cooling of a UV photopolymer utilizing dry ice, liquid nitrogen or other cryogenic cooling materials to substantially decrease 3D object build time.

In certain embodiments of the inventive system and method, 3D objects are not produced by layer upon layer additive manufacturing techniques; but rather are "grown and made" in larger reservoirs or vats of photonic energy reactive material, such as a photopolymer, at faster speeds utilizing "flash emitting" of photonic energy, and optionally with cryogenic cooling of the photonic energy reactive material.

In certain embodiments, the inventive system and method may include a build platform or palette, a UV curable resin or photopolymer, at least two photonic energy emitters, lasers, and a pump. In certain embodiments, the system includes a build platform, a UV curable resin or photopolymer, three lasers, and a pump. In other embodiments, the system can include thousands of lasers.

In other embodiments, the inventive system and method may include a plurality of photonic emitters and various propagation lenses, reflectors, and/or mirrors.

In certain embodiments, the invention is directed to a volumetric display including a flood and drains process, and cryogenic cooling (using Dry Ice, Liquid Nitrogen or other cryogenic cooling materials) of a UV photopolymer to substantially decrease part build time. The three-dimensional objects created by the system, machine and method of the present invention are not made in layers like in 3D printing, rather the three-dimensional objects are grown and made in large sections of photopolymer at faster speeds without 1000s of thin layers. With cryogenic cooling, and with the methods and systems of the invention, photopolymer parts can be made in sections rather than thin layers.

As depicted in FIG. 1, the inventive system and method (100) includes at least two (preferably three) photonic energy emitters (105, 110, 115) producing a correlated photonic beam or vector to produce an object (120) within a vat or reservoir of photo-reactive material (125). The at least two (preferably three) photonic energy emitters (105, 110, 115) intersect at a convergence point (130) to cure or solidify the photopolymer material (125) to form the three-dimensional object (120). In this manner, the photonic energy emitters (105, 110, 115) project an image onto the vat or reservoir of photo-reactive material (125).

A key characteristic of the inventive system and method is that each correlated photonic energy emitters (105, 110, 115) alone is of insufficient wattage or power to cure or solidify the photo-reactive material (125); thus, allowing the beam or vector to pass through the photopolymer material. However, when the at least two distinct correlated photonic energy emitters (105, 110, 115) are converged at any point (130) within the photopolymer material (125), the combined wattage or power of the beams or vectors becomes sufficient to cure or solidify the photopolymer material (125) at the convergence point (130).

When the lasers meet together, they create the volumetric image and the combined laser strength is strong enough to create the photo polymer reaction to cure the photo-reactive material (125).

In certain embodiments, the photonic energy emitters provide a volumetric image in the photo-reactive material (125). Within the system, the light is low and does not affect the resin. Once the photonic energy emitters provide sufficient light and flicker the volumetric image, the increase in light is used to make a 3D image, which in turn is sufficient to cure the photo-reactive material (125) and create a 3D volumetric object.

In certain embodiments, the strength of the photonic energy emitters is varied so that the light is increased in the photo-reactive material (125) and that a 3D volumetric object is created in layers.

In certain embodiments, the vat is a pentagon shaped vat. In certain embodiments, the vat is spherical. In certain embodiments the vat is cuboid, pentagonal and has a volume configured to be filled by the photo-reactive material (125).

Figure 2:
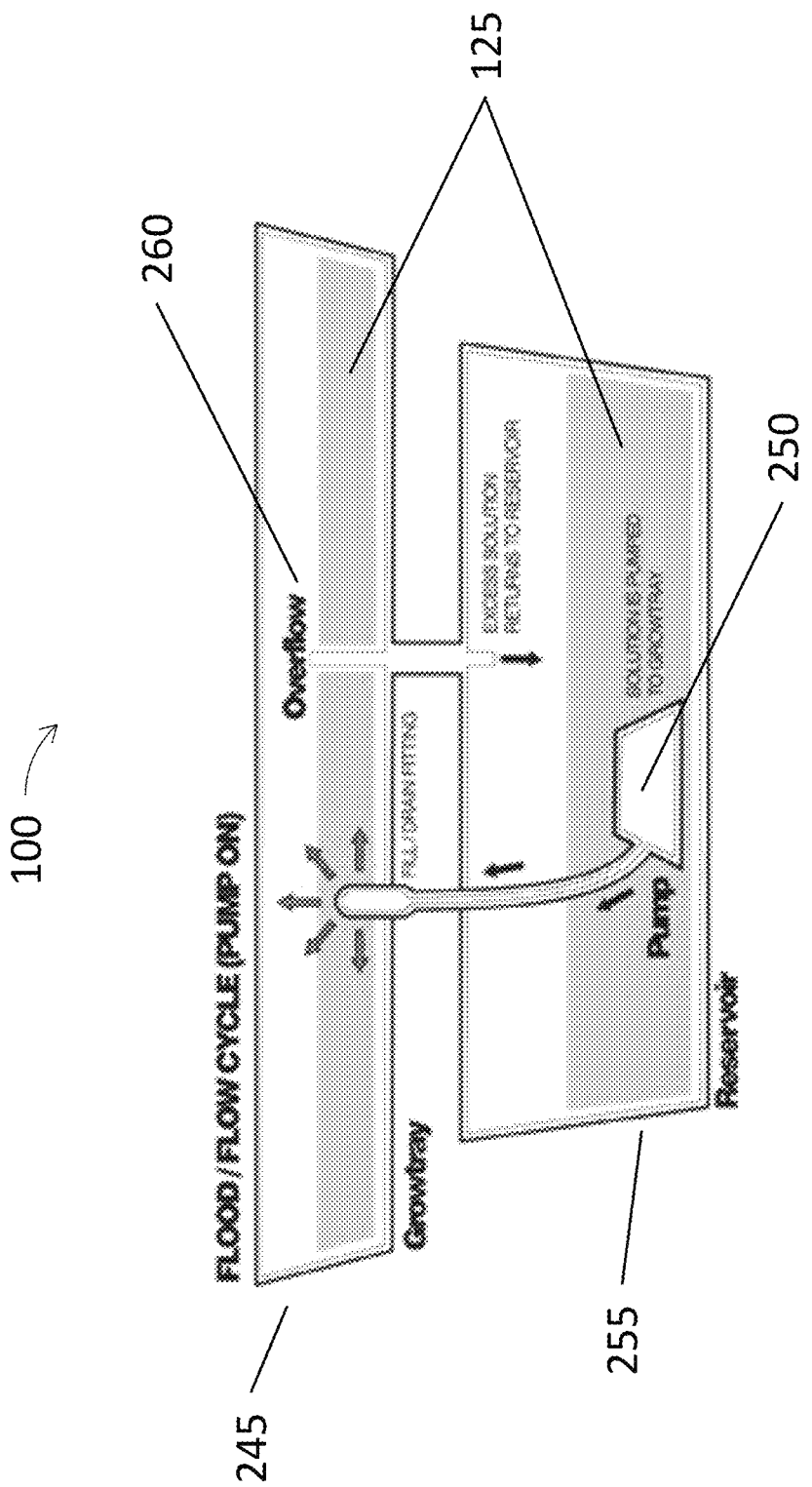
FIG. 2 depicts the inventive volumetric display vector system utilizing flood and drain grow tray and reservoir.

As depicted in FIG. 2, certain embodiments of the instant invention include "flood and drain" techniques to supply photo-reactive material (125) to a flat bottomed "growing tray" (245) fed with photo-reactive material (125) via a pump (250) from a reservoir or vat (255).

In operation, such a configuration of the inventive system and method utilizes a pump (250) to flood the growing tray (245); the growing tray (245) including an overflow drain (260) which determines and maintains the photo-reactive material (125) depth in the growing tray (245) at a desired level while the 3D volumetric object (120) is produced as previously described and depicted in FIG. 1. As the grow tray (245) is flooded with the photo-reactive material (125) the 3D object design is projected by the photonic energy emitters (105, 110, 115) project an image onto the grow tray (245).

If the photo reactive material (125) is transparent or clear, the grow tray (245) may be flooded with the photo reactive material (125) until the 3D object (120) is completed by the system (100). If the photo-reactive material (125) has pigment or color, the projected design image might only be able to penetrate to a specific depth within the photo-reactive material (125) depending upon pigment color, photonic energy emitter (105) frequency or wavelength, and the refractive, reflective, and diffusion indexes of the photo-reactive material (125). An example of this dependency and variability is so-called "mirages", which occur when a portion of the photo-reactive material (125) contains differing, refractive, reflective, or diffusion indexes than another portion; causing correlated photonic energy beams or vectors to bend or reflect in an unexpected and undesired manner.

In certain embodiments, the system project or flashes a full volumetric DLP/Laser (Lasers), LCD, LCD/LED, LED, SLA (Sterolithography) images in a completely full vat if photo polymer instead of the ebb & flow method.

In certain embodiments, the vat is flooded completely and then the full volumetric image is flashed in combination with one or more LED or SLA into the full resin tank then resin is drained.

In certain embodiments, the vat is flooded completely and then the full volumetric image is displayed or pulsed into the full resin tank then resin is drained.

In certain embodiments, the 3D Volumetric Image can be flashed or flickered in a completely full vat of photo polymer with no need to flood or drain.

In certain embodiments, the 3D Volumetric Image can be flashed, flickered or displayed in a completely full vat of photo polymer and once the part is made the vat is drained.

In certain embodiments, the method flashes a 3D image in a full vat of photonic energy curable material and 3D objects are created in seconds.

In certain embodiments, when the photo polymer is about a ¼-½ inch deep, the volumetric image is displayed in the resin then it ebbs upwards until the volumetric part is complete.

In certain embodiments of the instant inventive system and method, the photo-reactive material (125) is cryogenically cooled (for example with liquid nitrogen and dry ice) to allow for faster processing of larger 3D objects (120) made up of thin layers of solidified photo-reactive material (125) similar as to additive manufacturing systems and methods.

In certain embodiments, the cryogenic cooling means any cooling at low temperatures. It is not well-defined at what point on the temperature scale refrigeration ends and cryogenics begins, but scientists assume a gas to be cryogenic if it can be liquefied at or below −150° C.

In certain embodiments, the reservoir (255) may be sealed to inhibit oxygen and oxygen diffusion. In certain embodiments, the reservoir is sealed (like a sealed freezer) to inhibit oxygen and keep the photo reactive material between 50 degrees Fahrenheit to negative 150 degrees Fahrenheit.

In certain embodiments, high or low viscosity resin is provided to help slow oxygen diffusion.

In certain embodiments, cryogenic cooling of the photopolymer (or other resins) enables substantially faster 3D object (120) production; allowing for 3D objects (120) to be produced while reducing or eliminating heat concerns which may warp or distort the final 3D object (120).

In certain embodiments, the cryogenic cooling of the photo polymer (or other resins), makes the parts substantially faster. The cryogenic cooling allows for the parts to be made while eliminating heat concerns that could warp the parts.

In certain embodiments, the inventive system allows for parts to be created via chunks rather than layers. In certain instances, a part made by conventional 3D printing would take 1000 layers to make the part. Utilizing a system in accordance with the present invention, the part can be created in 10 by 10 continuous chunks or sections, thereby substantially decreasing time required to build an end product.

In certain embodiments, the inventive system may use large chunks or sections from object images and compile and use vectors to project and build for example one-quarter ($¼^{th}$) of a 3D object to meet any maximum size limitation of a printing or additive manufacturing device.

In certain embodiments, the system uses one or more of LCD, LED, LCOS, 3d Printed SLM, and/or DLP projector technologies. These techniques may be used in combination with lasers, or instead of lasers.

In certain embodiments, the system uses LCD, LED, LCOS, 3D Printed SLM, SLA (Sterolithography) and DLP projection technology to create objects for various industries alone or in combination.

In certain embodiments, it is also possible for DLP/Laser, LCD, LED, InfraRed LED, or combination of both LCD/LED to display, flash or pulse the full Volumetric 3D image to make volumetric parts with no layers involved.

Depending on the size of the object being built it could be necessary for the Volumetric 3D linage to be displayed, flashed or pulsed on and off.

LED—LCD Technique

In certain embodiments, numerous LED lights and/or lasers are used together with LCD projection depending upon the size of the vat storing the photo-reactive material. The LEDS are used to light up after or before the volumetric LCD image, which is displayed, pulsed, or flashed. First the volumetric LCD image is displayed then then the LED lights make it bright enough, so the photo polymerization happens.

The LEDs are combined with the Volumetric LCD as the volumetric LCD is not bright enough to make the photo polymerization reaction occur. But the volumetric LCD is such a weak light source that it is weak enough to fully penetrate the photopolymer when special concentrations of O2 and photo initiator are added. Then the LEDs are lit up and the photo polymerization of the volumetric LCD image occurs.

Inside-Outside Technique

In certain embodiments, the system projects full 3D images using an "inside-outside" technique. In this technique, the full 3D images are projected from the photonic energy emitters to an interior area of the 3D object to be cured. The interior portion of the 3D object to be made is first cured, followed by curing the exterior portion so that more complex and parts with larger volume can also be made from the inside out.

In certain embodiments, the infrared LEDs are able to be used as photonic energy emitters. In this embodiment, the infrared LEDs are used for non-transparent colored photopolymers, as the module sends out light with longer wavelengths than visible light. The longer wavelength light is configured to cure the curable material. The longer wavelengths from the infra-red led give the volumetric display the ability to penetrate deep in the resin.

Design Considerations

During cuing of the material, the ratio of oxygen (02) to Resin and exposure time is very important. Too long of an exposure will solidify non-target areas and too short of an exposure will cause a fragile 3D printed object to be made, which is undesirable.

An exposure of it for too long of a period of time could result in deformation of the object.

Successive Stacking of Planar Layers

In certain embodiments, a 3D Printed SLM (Spatial Light Modulator) can also be used to project true 3D Volumetric Images to 3D Print Parts with no layers. A 3D Printed SLM is 3D in shape and projects 3d images while a normal SIM can only project 2d images.

In this manner, the inventive system can cure layers of curable material, so that parts are made in layers.

In certain embodiments, the inventive system includes creating volumetric layers similar to "Russian Matryoshka Dolls" whereby internal layers are cured first followed by external layers being cured.

In certain embodiments, the invention provides: a system for achieving a three-dimensional (3D) volumetric display by using a successive stack of transparent two-dimensional planar layers each having light-absorbing elements representing contours as dark features associated with individual respective slices through a three-dimensional object in a direction perpendicular to the plane of view of each of the planar layers so that the combined assembled volumetric display when viewed achieves a volumetric display which may be reconfigured using physical, chemical, electronic and computer-assisted means, so as to effect a dynamic volumetric display.

In this manner, photo-reactive material (125) is cured in volumetric layers to form 3D objects.

In certain embodiments, LCD Panels will use a successive stack of transparent two-dimensional planar layers to crest the Volumetric image.

Figure 3A:
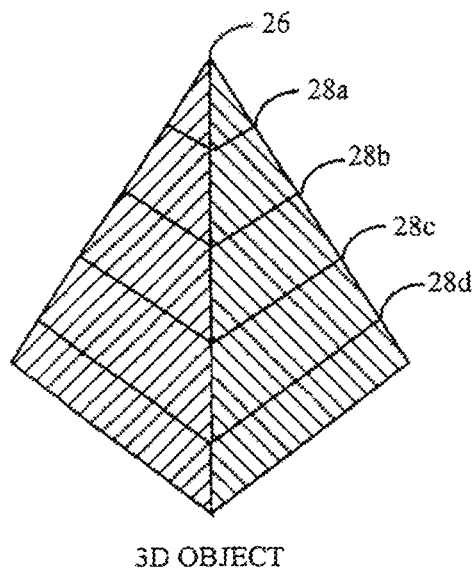
FIG. 3A illustrates a 3D object partitioned into image slices.
Figure 3B:
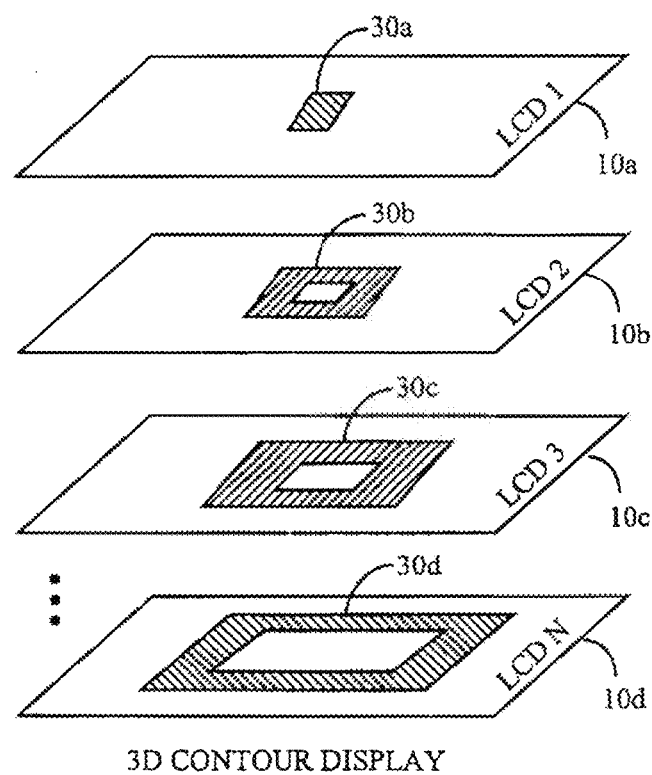
FIG. 3B illustrates stacked LCD panels with display slices displaying respective contours of respective image slices.
Figure 3C:
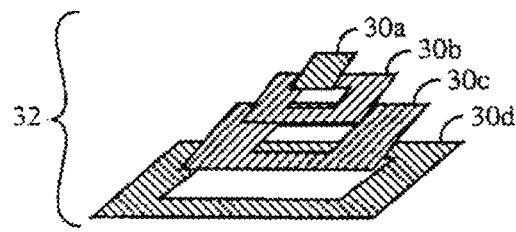
FIG. 3C illustrates the resulting displayed image of displayed contours.
Figure 4A:
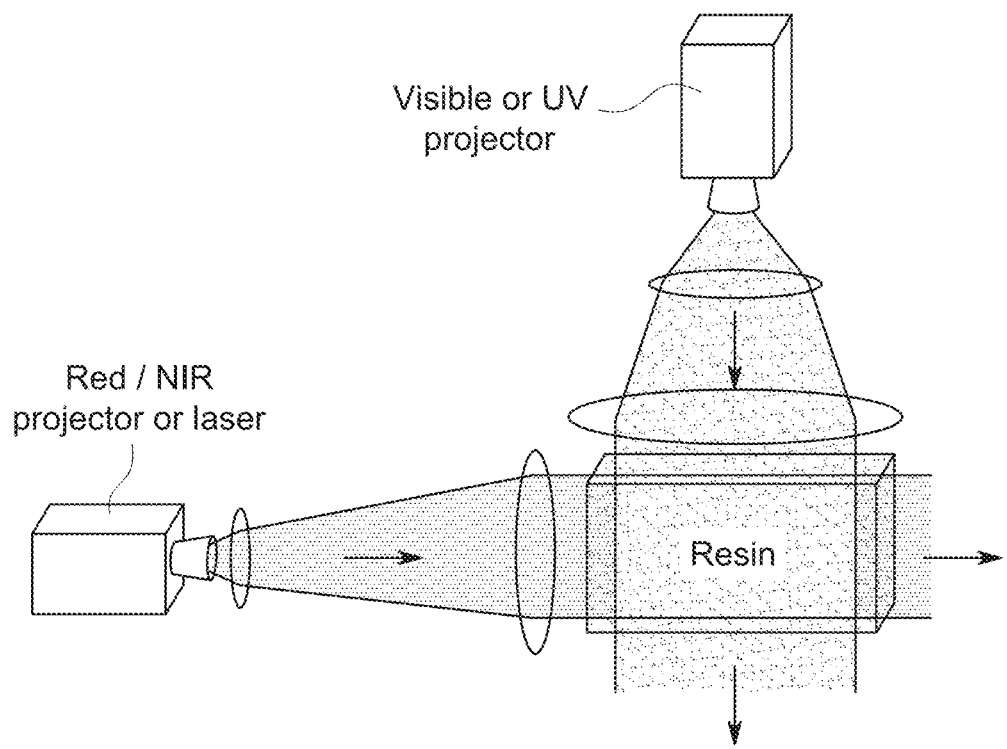
FIGS. 4a-4c shows a multiple projector model using Near Infrared or UV projectors such that dual Light Wavelength and Dual Color is provided.
Figure 4B:
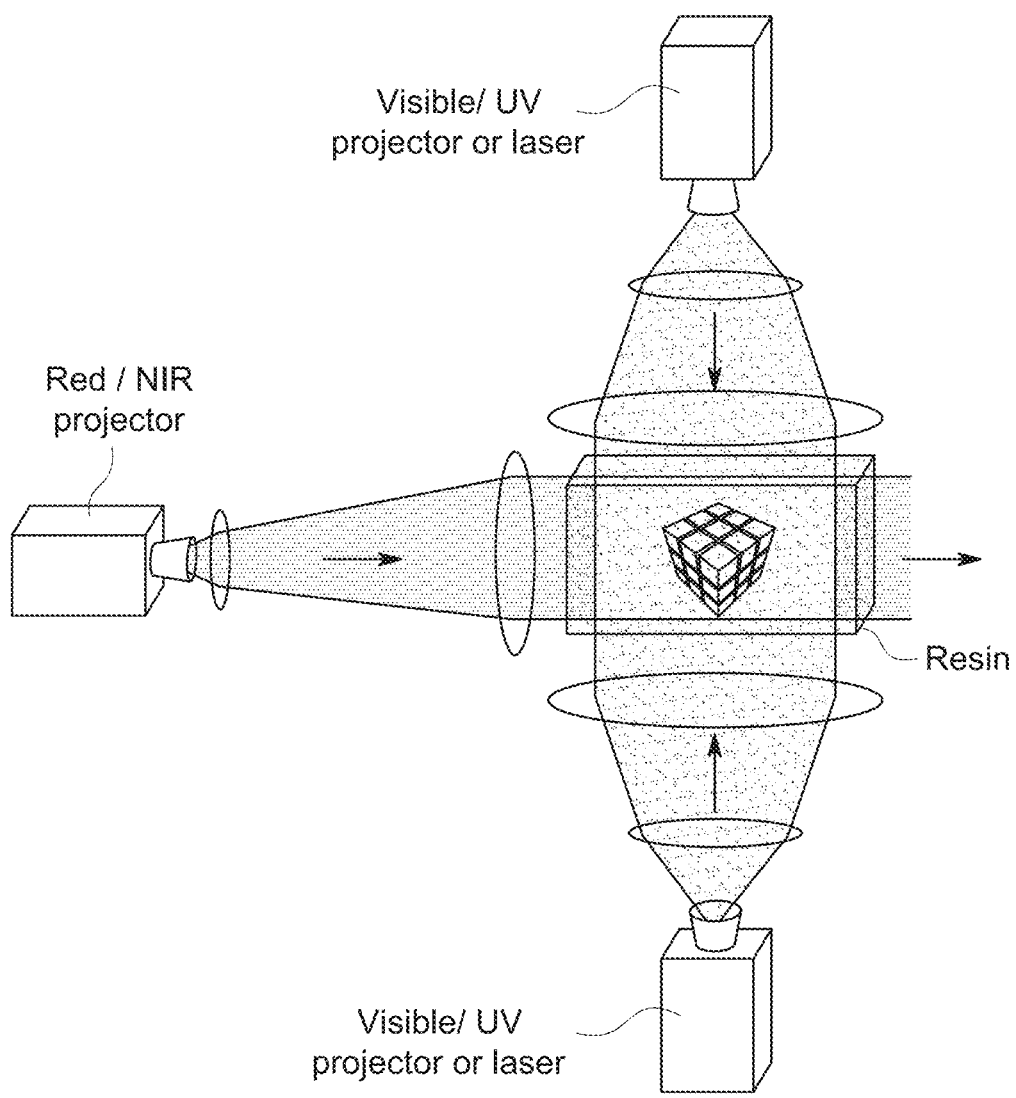
Figure 4C:
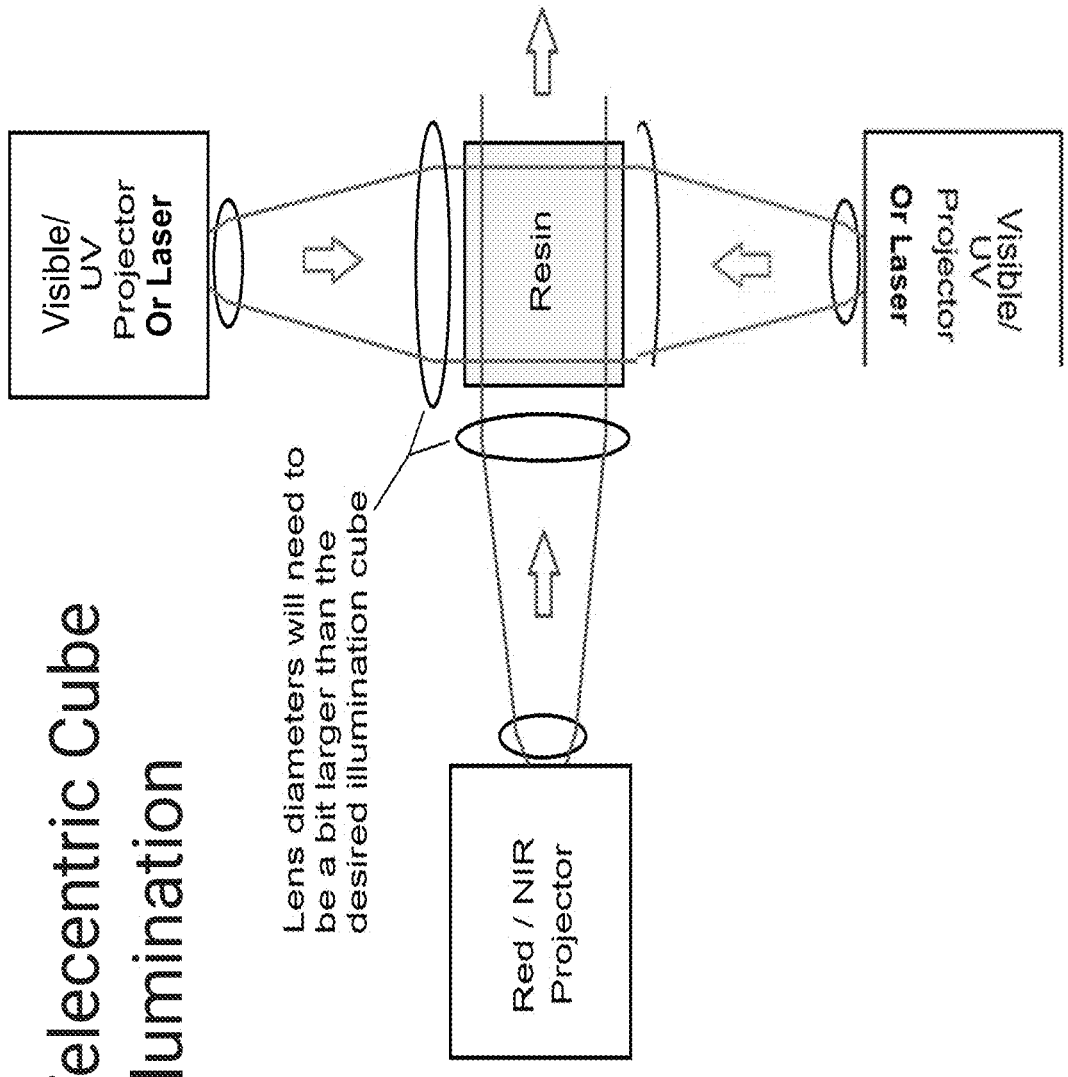

Referring to FIGS. 3A, 3B and 3C, stacking of the liquid crystal display panels 10 forms the 3-dimensional volumetric display for viewing a 3D image 26. The image 26 is preferably imaged along image slices 28a, 28b, 28c through 28d preferably lying orthogonal to the 3D line of sight 20. The N LCD panels 10a, 10b, 10c through 10d display image contours 30a, 30b, 30c through 30d, respectively, corresponding to the image slices 28a, 28b, 28c through 28d. The image contours 30 are displayed as sets of data describing the information related to the associated contour of the image slices 28 of the 3D image 26. For examples, LCD panels 10 display data respectively representing slices 28. The top LCD panel 10a preferably displays data representing the upper positional information of image slice 28a of the 3D object 26. The bottom LCD panel 10d would represent the lower positional information of the image slice 28d of the 3-D object 26. Hence, there is preferably a respective and equal set of image slices 28 respectively corresponding to LCD panels 10 and image contours 30. The image contours 30a, 30b, 30c through 30d, when viewed as a stack, as shown in FIG. 2C, appear to a viewer as a solid 3D contour image 32 comprising superimposed contour slices 30a, 30b, 30c through 30d. Each display contour 30 a digitized representation of contour data that depicts and represents the associated image slice 28 within the original object 26. The larger the number of images slice 28 that describe the 3D object 26, the larger number of contour slices 30 required and the smoother and more continuous is the resulting displayed contour image 32. The image 32 created in the volumetric display 24 may also be viewed at angles which are off the axis normal 20 to the plane of the LCD panels 10. This format enables the displayed image 32 to be viewed for all angles less than ninety degrees and greater than five degrees with an aspect ratio of one to ten of image size to display size above the bottom plane 10d of the 3D volume 24. The panel display surface of polarizer 14 enables a wide range of viewing angles off the orthogonal line of sight 20. The observer needs no special training or equipment to view the 3D displayed image 32. Visual perception of 3D is readily apparent to the viewer. Further, the true display image 32 does not present the viewer with incorrect parallax motion in response to movement by the viewers.

In certain embodiments, the photonic energy emitters provide an actual 3D volume displays the original 3D information by using a material within the 3D volume comprising substances which can emit visible light under localized fluorescence excitation. Each voxel is individually addressed using multiple laser beams, having intensity and wavelength so arranged that the fluorescence is only significantly exhibited in a voxel where all the individual beams come together. An actual transparent 3D volume is used to render the original 3D information. Disadvantageously, the volume which will contain the 3D image must be a special homogeneous material, along with careful tailoring of the laser excitation source, so as to enable the 3D display to become visible. The confluence of these specific material and radiation properties are disadvantageously required to enable the device to function. These systems teach the construction of 3D volumetric display using expensive homogeneous materials and disadvantageously require special fluorescence requirements of the materials within the 3D volumetric light radiant structure using fluorescence-exciting lasers.

DLP/Laser Technology in Combination with UV Photo Polymers

In certain embodiments, the present invention in part is directed towards utilizing known holographic vector display technologies, and "vects" or "vector objects", in combination with a UV curable photopolymer for producing 3D objects.

In certain embodiments, image files are loaded into a holographic vector display technology system, the images are converted to "vects" and drawn into the air with visible light and a curable photo-polymer solidified is accordance with the parameters specified in an "vect object" files.

In certain embodiments, the present invention incorporates open source volumetric display technology with the inventive and improved part growing method to produce articles faster and more accurately than known conventional 3D printing or additive manufacturing systems.

In certain embodiments, the present invention may be used with various other volumetric display technologies.

Flood and Drain Technology

The concept for a 5D Part Growing System includes a flood and draining photo-polymer and three lasers coming from different points to make an object. The laser can only go so deep in a photo polymer and helps create and make the object.

A spherical vat positioned under the circle spherical area and includes a UV curable photo-polymer. In certain embodiments, the UV curable photo-polymer is doped with oxygen and photo initiator, such that there is no limit to the depth that the volumetric image can travel.

The system is a voxel part growing machine, as the photo polymer before it floods to the grow tray is cryogenically cooled with liquid nitrogen and dry ice. This is how the photo polymerization process speeds up from small thin layers like conventional additive manufacturing to large sections in 5D Part Growing.

The resin is below and it's cryogenically cooled and the container is like a mini freezer that keeps the photo polymer very cold below zero (liquid nitrogen is provided to regulate the temperature).

Then the pump or siphon pumps up the photo polymer (aka 3D Printing Resin) slowly to the top tray or vessel depicted in the PNG file below where the lasers display a 3D image using DLP/Laser technology as shown in (https://youtu.be/kPW7ffUr81g).

In certain embodiments, the photo polymer stays in the reservoir below then it ebbs and flows. The pump causes the UV curable photo polymer to fill (flood) the system until it fills the spherical vat.

When the photopolymer filling/flooding the system reaches the selected tube height, it drains back down to the reservoir where it can be reused or recirculated back again. There is a siphon with a filter that allows particular matter to be filtered before entering back into the container. The siphon allows the UV curable photo polymer to back down into the reservoir through the pump (draining the system).

Scalability

The system allows for parts to be created via chunks rather than layers. In certain instances, a part made by conventional 3D printing would take 1000 layers to make the part.

Using the 5D system of the present invention, the part can be created in 10-10 continuous chunks, thereby increasing the speed of part build time substantially.

The system allows for full 3D parts to be created or in chunks.

In certain embodiments, the system can use large chunks from images so therefore in these embodiments, projected chunks of a ¼ of the image at a time can be used or whatever the maximum limitation the device can project at one time, with LCD, DLP, and LCOs then it could just be flooded and drained.

Build Process

In certain embodiments, the system has non-stick silicone similar to parchment paper on the bottom of the grow tray as that is the build plate. Then the full 3D Volumetric Display is displayed to lay flat on the grow tray while it is flooding.

In certain embodiments, LCD/LED, LED, Infrared LED, 3d Printed SLM, and SLA (Sterolithography) are used with the system. In certain embodiments. In certain embodiments, each of these techniques can be used in combination with the Volumetric LCD Panel.

The part is made on the system while Resin is flowing up not ebbing down, which involves the creation of parts without using layers (such as in conventional 3D printing). In certain embodiments, if the resin has a has viscosity ((Thick Heavy Resin) the full part can be made while floating in the resin).

The system worked by having an image sitting flat on the flood tray floor.

The bottom of the flood tray has an anti-stick Teflon coating or Parchment paper so once the part is made it can pull right off.

The system and process starts bottom up as a little photo polymer like a half inch is in the flood tray then the laser put the object in the UV curable photo polymer. Then it is slowly pumped up from reservoir into the grow tray as the grow tray is filled with goo the part is made.

In certain embodiments, the photo polymer has high viscosity.

Example 1—Proof of Concept

An inventive proof of concept was created whereby a heart shaped photo polymer was cryogenically cooled with liquid nitrogen then was maintained under two pieces of dry ice. Afterwards, sunlight was concentrated on it and turned into a fully functional part with no layers in 3 seconds (https://instagram.com/p/BTp7g1KDRwN/).

Having thus described several embodiments for practicing the inventive method, its advantages and objectives can be easily understood. Variations from the description above may and can be made by one skilled in the art without departing from the scope of the invention.

Accordingly, this invention is not to be limited by the embodiments as described, which are given by way of example only and not by way of limitation.

What is claimed is:

1. A system for producing three-dimensional objects, the system comprising:
   at least one photonic energy emitter;
   a flood and drain system having a chamber system;
   a build platform;
   photonic energy curable material, and
   a cryogenic cooling means,
   wherein the system is configured to allow the photonic energy curable material to flood and drain within a chamber system,
   wherein the at least one photonic energy emitters cure the photonic energy curable material to produce a three-dimensional object,
   wherein the cryogenic means is configured to cool the photonic energy curable material after the photonic energy curable material has been cured, wherein the photonic energy curable material is a UV photopolymer.

2. The system of claim 1, wherein at least one photonic energy emitters uses dual light wavelengths.

3. The system of claim 1, wherein at least one photonic energy emitter uses light to polymerize the photonic energy curable material.

4. The system of claim 1, wherein a photo switchable photo initiator is used to switch and cure the photonic energy curable material.

5. The system of claim 1, wherein the system comprises 1-1000 infrared, visible light, UV, or Near-Infrared Photonic Energy emitters.

6. The system of claim 1, wherein at least one photonic energy emitter includes a laser to cure the photonic energy curable material.

7. The system of claim 1, wherein at least one photonic energy emitter includes a DLP Projector and one or more Lasers.

8. The system of claim 1, wherein the at least one photonic energy emitter includes Spatial Light Modulators (SLM).

9. The system of claim 1, wherein the at least one photonic energy emitter include two or more a photonic energy emitters, where in the emitted energy from the two or more photonic energy emitters crosses paths and combines to form an intense energy emission to polymerize the photonic energy curable material.

10. The system of claim 1, wherein the photonic energy curable material is cured in chunks.

11. The system of claim 1, wherein the at least one photonic energy emitter includes an emitter having multiple colors.

12. The system of claim 1, wherein the system includes one, two or three photonic energy emitters.

13. The system of claim 1, wherein 2 DLP Projectors are used.

14. The system of claim 1, wherein at least two photonic energy emitters form a Volumetric Display.

15. The system of claim 1, wherein the flood and drain system includes an upper chamber, a pump and a lower chamber, and wherein the photonic energy curable material flows from the lower chamber to flood the upper chamber, and returns to the lower chamber, while a portion of the photonic energy curable material is cured to form the three-dimensional object.

16. The system of claim 1, wherein the three-dimensional object is configured be made in sections whereby the at least three photonic energy emitters create various three-dimensional objects that merge to form a larger three-dimensional object.

17. The system of claim 1, wherein the at least three photonic energy emitters include two distinct photonic energy emitters capable of emitting different wavelengths and colors, utilizing DLP Projectors, Lasers, LCD Panels, or a combination thereof.

* * * * *